(12) United States Patent
Miyazaki

(10) Patent No.: US 8,993,666 B2
(45) Date of Patent: Mar. 31, 2015

(54) RUBBER COMPOSITION FOR INSULATION OF TIRE AND TIRE USING SAME

(75) Inventor: Tatsuya Miyazaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 10 days.

(21) Appl. No.: 13/643,226

(22) PCT Filed: Apr. 12, 2012

(86) PCT No.: PCT/JP2012/059993
§ 371 (c)(1),
(2), (4) Date: Oct. 24, 2012

(87) PCT Pub. No.: WO2012/176538
PCT Pub. Date: Dec. 27, 2012

(65) Prior Publication Data
US 2013/0137807 A1   May 30, 2013

(30) Foreign Application Priority Data

Jun. 21, 2011 (JP) .................................. 2011-137715
Mar. 21, 2012 (JP) .................................. 2012-063762

(51) Int. Cl.
*C08L 7/00* (2006.01)
*C08K 3/04* (2006.01)
(Continued)

(52) U.S. Cl.
CPC .................. *C08L 7/00* (2013.01); *B60C 1/0025* (2013.01); *B60C 9/14* (2013.01); *B60C 13/00* (2013.01)
USPC ........... 524/425; 524/332; 524/418; 524/495; 524/331; 523/437; 523/440

(58) Field of Classification Search
USPC .................. 524/331, 418, 425, 495; 523/438
See application file for complete search history.

(56) References Cited

U.S. PATENT DOCUMENTS 4,477,611 A * 10/1984 Sperley ........................... 524/71
7,671,126 B1 * 3/2010 Sandstrom et al. ........... 524/495
(Continued)

FOREIGN PATENT DOCUMENTS

CN 101802078 A 8/2010
CN 101883818 A 11/2010
(Continued)

OTHER PUBLICATIONS

Sigma-Aldrich Particle Size Conversion Table—2013 http://www.sigmaaldrich.com/chemistry/stockroom-reagents/learning-center/technical-library/particle-size-conversion.html.*
(Continued)

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

For the purpose of improving rolling resistance and durability, the present invention provides a rubber composition for insulation of a tire comprising 0.2 to 4 parts by mass of (B) an alkylphenol-sulfur chloride condensate, and 20 to 59 parts by mass of (C) carbon black having a BET specific surface area of 25 to 50 m$^2$/g based on 100 parts by mass of (A) a rubber component comprising 30 to 85% by mass of (a1) a natural rubber and/or an isoprene rubber, 0 to 70% by mass of (a2) at least one styrene butadiene rubber selected from the group consisting of an emulsion-polymerized styrene butadiene rubber, a solution-polymerized styrene butadiene rubber and a modified styrene butadiene rubber, and 0 to 60% by mass of (a3) a butadiene rubber, and a tire having insulation prepared from the rubber composition.

4 Claims, 1 Drawing Sheet

(51) Int. Cl.
*C08K 3/06* (2006.01)
*C08K 5/36* (2006.01)
*C08L 9/06* (2006.01)
*B60C 1/00* (2006.01)
*B60C 9/14* (2006.01)
*B60C 19/00* (2006.01)
*B60C 13/00* (2006.01)

(56) References Cited

U.S. PATENT DOCUMENTS

| | | | |
|---|---|---|---|
| 2010/0041815 A1* | 2/2010 | Miyazaki | 524/449 |
| 2010/0181002 A1* | 7/2010 | Miyazaki | 152/564 |
| 2010/0204372 A1 | 8/2010 | Miyazaki | |
| 2010/0224299 A1* | 9/2010 | Miyazaki | 152/525 |
| 2010/0249278 A1 | 9/2010 | Miyazaki | |
| 2011/0094649 A1 | 4/2011 | Miyazaki | |
| 2012/0259051 A1 | 10/2012 | Miyazaki | |

FOREIGN PATENT DOCUMENTS

| CN | 102731855 A | 10/2012 |
|---|---|---|
| EP | 2007-284537 A | 1/2007 |
| EP | 2 009 049 A1 | 12/2008 |
| EP | 2 159 074 A1 | 3/2010 |
| JP | 2007-153060 A | 6/2007 |
| JP | 2007-302865 A | 11/2007 |
| JP | 2009-84533 A | 4/2009 |
| JP | 2009-114427 A | 5/2009 |
| JP | 2009-138148 A | 6/2009 |
| JP | 2009-155631 A | 7/2009 |
| JP | 4550763 B2 | 7/2010 |
| JP | 4638933 B2 | 12/2010 |

OTHER PUBLICATIONS

Pedro M. Vicario, "CABOT Carbon Blacks for rubber moulding articles—New challenges for the industry through new products", CRP-02-01, EXPOBOR 2001, CABOT, S.A., Zierbena, Spain.*
Coal Fillers Inc.—Austin Black 325™—typical properties—http://www.rubberworld.com/coalfillers/products.htm.*
ASTM D1765-06—Standard Classification System for Carbon Blacks Used in Rubber Products—Aug. 2006.*
Pedro M. Vicario, "CABOT Carbon Blacks for rubber moulding articles—New challenges for the industry through new products", CRP-02-01, EXPOBOR 2001, CABOT, S.A., Zierbena, Spain—Downloaded—Apr. 1, 2013—Published Jul. 17, 2002.*
Coal Fillers Inc.—Austin Black 325™—typical properties—http://www.rubberworld.com/coalfillers/products.htm Downloaded—Apr. 3, 2013.*

* cited by examiner

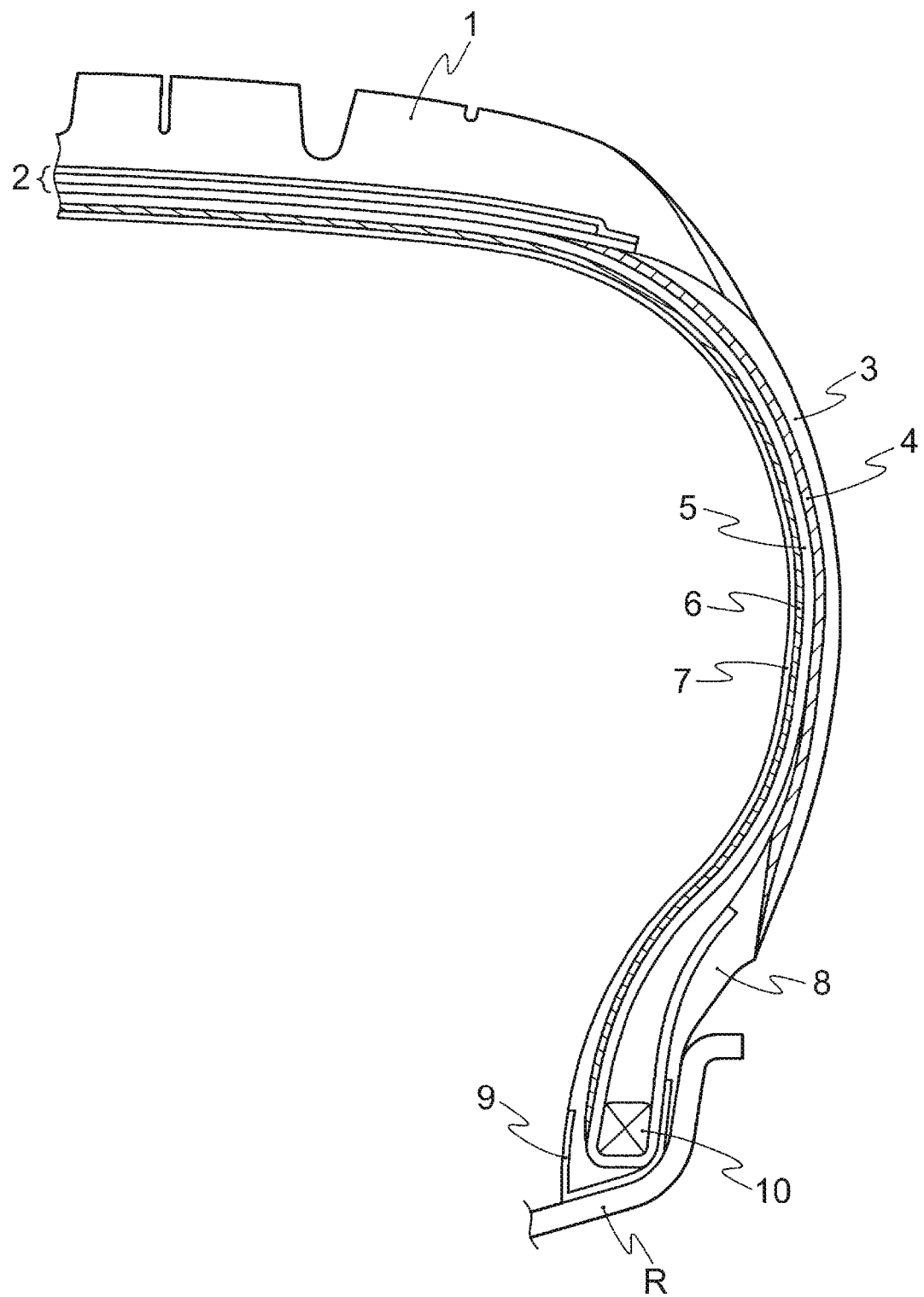

RUBBER COMPOSITION FOR INSULATION OF TIRE AND TIRE USING SAME

TECHNICAL FIELD

The present invention relates to a rubber composition for insulation of a tire and to a tire using insulation prepared by using the rubber composition.

BACKGROUND ART

Recently, there is an increasing demand for low fuel consumption of cars, and a demand for a tire assuring a low rolling resistance is also increasing. Accordingly, there is used a tire giving rolling resistance reduced by decreasing tan δ of rubber compositions constituting each member of a tire, not excepting a rubber composition for insulation.

Insulation of a tire is a member to be provided between a case and a component such as a tie gum provided between an inner liner and a case and an inner layer sidewall provided between a case and an outer layer sidewall, and is used for the purpose of improving durability of a tire mainly by reinforcing a case. Therefore, a proper rubber strength and E* (complex elastic modulus) are required for rubber compositions for insulation. Here, in order to secure a proper complex elastic modulus and low tan δ, reversion property at vulcanization is important.

Since a tie gum is located between an inner liner and a case, crack growth property and resistance to heat deterioration as in a rubber composition for an inner liner are not required particularly, and crack growth property, tear strength and cord adhesion as in a rubber composition for case topping are not required particularly. Moreover, since an inner layer sidewall is provided between a case and an outer layer sidewall, crack growth property, tear strength and cut resistance as in a rubber composition for an outer layer sidewall are not required, and crack growth property, tear strength and cord adhesion as in a rubber composition for case topping are not required particularly.

A rubber composition for case topping has been used as a rubber composition for insulation so far. Rolling resistance of a tire can be reduced by using a rubber composition for case topping giving reduced rolling resistance as a rubber composition for insulation. However, as mentioned above, while proper rubber strength and reversion property are required for a rubber composition for insulation, crack growth property, tear strength and cord adhesion are also required for a rubber composition for case topping in addition to proper rubber strength and reversion property. Namely, it is possible to use a rubber composition for case topping as one for a rubber composition for insulation, but there is a problem that cost is increased.

Patent Document 1 describes an invention for improving rolling resistance and steering stability by using a rubber composition for sidewall, clinch and/or insulation comprising at least one vulcanization accelerator selected from the group consisting of a filler, sulfur, a citraconimide compound, an organic thiosulfate compound, an alkylphenol-sulfur chloride condensate and a specific metal salt of methacrylic acid in a specific amount based on a specific rubber component. However, since this rubber composition is not one for specific use for insulation such as a tie gum and an inner layer sidewall, cost is high and sheet processability is not enough for a rubber composition for insulation. Further, this rubber composition has improved cord adhesion and crack growth property, but these are over performance for application to a rubber composition for insulation.

Patent Document 2 describes an invention for enhancing moisture barrier property to improve durability of a tire by using a rubber composition for insulation comprising 5 to 70 parts by mass of a pulverized bituminous coal powder having an average particle size of not more than 0.1 mm based on 100 parts by mass of a diene rubber comprising 70 to 100 parts by mass of a natural rubber. However, improvement of rolling resistance is not taken into consideration.

PRIOR ART DOCUMENTS

Patent Documents

Patent Document 1: JP 4638933 B
Patent Document 2: JP 4550763 B

DISCLOSURE OF THE INVENTION

Problem to be Solved by the Invention

An object of the present invention is to provide a rubber composition for insulation of a tire being capable of improving rolling resistance and durability and reducing cost, and a tire produced using this rubber composition.

Means to Solve the Problem

The present invention relates to a rubber composition for insulation of a tire comprising 0.2 to 4 parts by mass of (B) an alkylphenol-sulfur chloride condensate and 20 to 59 parts by mass of (C) carbon black having a BET specific surface area of 25 to 50 m²/g based on 100 parts by mass of (A) a rubber component comprising 30 to 85% by mass of (a1) a natural rubber and/or an isoprene rubber, 0 to 70% by mass of (a2) at least one styrene butadiene rubber selected from the group consisting of an emulsion-polymerized styrene butadiene rubber, a solution-polymerized styrene butadiene rubber and a modified styrene butadiene rubber, and 0 to 60% by mass of (a3) a butadiene rubber.

It is preferable that the content of (a3) butadiene rubber in the rubber component (A) is 0% by mass, and the rubber composition comprises 3 to 30 parts by mass of (D) a filler which is at least one selected from the group consisting of a pulverized bituminous coal powder, calcium carbonate, talc, hard clay, sepiolite and diatomaceous earth powder and has an average particle size of not more than 50 μm.

It is preferable that the content of the alkylphenol-sulfur chloride condensate (B) is from 0.5 to 3 parts by mass, the content of the carbon black (C) is from 30 to 45 parts by mass, a content of the pulverized bituminous coal powder as the filler (D) is from 7 to 20 parts by mass, a total sulfur content is from 1.5 to 2.5 parts by mass based on 100 parts by mass of the rubber component, and further, silica is contained in an amount of from 0 to 10 parts by mass based on 100 parts by mass of the rubber component.

In the present invention, it is preferable that a tire is one having insulation prepared from the rubber composition mentioned above.

Effect of the Invention

The present invention can provide a rubber composition for insulation assuring superior rolling resistance and durability and further being capable of reducing cost as compared with a rubber composition for case topping by using the rubber composition comprising specific amounts of an alkylphenol-sulfur chloride condensate and carbon black having a BET specific surface area of 25 to 50 m²/g based on 100 parts by mass of a specific rubber component. Further, the present invention can provide a tire having insulation comprising the rubber composition which assures low fuel consumption, has good durability and gives a reduced cost as compared with a tire having insulation comprising a rubber composition for case topping.

BRIEF DESCRIPTION OF THE DRAWING

FIG. 1 A partial cross-sectional view of a pneumatic tire according to one embodiment of the present invention.

EMBODIMENT FOR CARRYING OUT THE INVENTION

The rubber composition for insulation of the present invention comprises 0.2 to 4 parts by mass of (B) the alkylphenol-sulfur chloride condensate and 20 to 59 parts by mass of (C) carbon black having a BET specific surface area of 25 to 50 m²/g based on 100 parts by mass of (A) the rubber component comprising 30 to 85% by mass of (a1) a natural rubber and/or an isoprene rubber, 0 to 70% by mass of (a2) at least one styrene butadiene rubber selected from the group consisting of an emulsion-polymerized styrene butadiene rubber, a solution-polymerized styrene butadiene rubber and a modified styrene butadiene rubber, and 0 to 60% by mass of (a3) a butadiene rubber, thereby enabling rolling resistance and durability required for insulation to be improved while cost is reduced.

The rubber component (A) of the present invention comprises (a1) a natural rubber (NR) and/or an isoprene rubber (IR) and (a2) at least one styrene butadiene rubber selected from the group consisting of an emulsion-polymerized styrene butadiene rubber (E-SBR), a solution-polymerized styrene butadiene rubber (S-SBR) and a modified styrene butadiene rubber (modified SBR), and further can contain (a3) a butadiene rubber (BR).

With respect to NR, those of RSS#3 grade which are usually used in the field of rubber industry can be used. Also, with respect to IR, usual ones in the field of rubber industry can be used.

The content of (a1) NR and/or IR in the rubber component (A) is not less than 30% by mass from the viewpoint of superior rolling resistance and processability, and is preferably not less than 40% by mass, more preferably not less than 50% by mass from the viewpoint of good processability. Further, the content of (a1) NR and/or IR is not more than 85% by mass from the viewpoint of good reversion property and durability, and further, is preferably not more than 80% by mass, more preferably not more than 75% by mass from the viewpoint of good reversion property.

E-SBR is a styrene butadiene rubber obtained by emulsion polymerization.

The content of styrene of E-SBR is preferably not less than 15% by mass, more preferably not less than 20% by mass. When the content is less than 15% by mass, there is a tendency that reversion arises and E* decreases. The styrene content is preferably not more than 70% by mass, more preferably not more than 60% by mass. When the styrene content exceeds 70% by mass, rolling resistance property tends to be lowered.

S-SBR is a styrene butadiene rubber obtained by solution polymerization.

The content of styrene of S-SBR is preferably not less than 10% by mass, more preferably not less than 15% by mass. When the styrene content is less than 10% by mass, there is a tendency that reversion property tends to be lowered. The styrene content is preferably not more than 45% by mass, more preferably not more than 40% by mass. When the styrene content exceeds 45% by mass, processability tends to be lowered and rolling resistance property tends to be lowered.

Examples of the modified SBR are emulsion polymerization-modified SBR (modified E-SBR) and solution polymerization-modified SBR (modified S-SBR).

With respect to the modified SBR, those subjected to coupling with tin, silicon or the like are used preferably. Example of a coupling method for the modified S-SBR is a method of, for example, allowing alkali metal (such as Li) or alkali earth metal (such as Mg) at a molecular chain terminal of the modified SBR to react with tin halide, silicon halide or the like according to a normal method.

The modified SBR is a (co)polymer obtained by (co)polymerizing conjugated diolefin alone, or conjugated diolefin with an aromatic vinyl compound and preferably has a primary amino group and an alkoxysilyl group.

The primary amino group may be bonded at any of the initiation terminal of polymerization, the termination terminal of polymerization, the main chain of a polymer and the side chain of a polymer. But it is preferably introduced at the initiation terminal of polymerization or the termination terminal of polymerization because energy loss from polymerization terminal is suppressed and hysteresis property can be improved.

The content of bonded styrene of the modified SBR is preferably not less than 5% by mass, more preferably not less than 7% by mass from the viewpoint of good reversion property. Further, the content of bonded styrene of the modified SBR is preferably not more than 30% by mass, more preferably not more than 20% by mass from the viewpoint of superior rolling resistance property.

The content of at least one styrene butadiene rubber (a2) selected from the group consisting of E-SBR, S-SBR and modified SBR in the rubber component (A) is not less than 0% by mass, and is preferably not less than 15% by mass from the viewpoint of superior reversion property and rolling resistance property, and further, is preferably not less than 25% by mass, further preferably not less than 30% by mass from the viewpoint of superior reversion property. Moreover, the content of at least one styrene butadiene rubber (a2) selected from the group consisting of E-SBR, S-SBR and modified SBR is preferably not more than 70% by mass from the viewpoint of superior rolling resistance property, and further, is preferably not more than 60% by mass, further preferably not more than 50% by mass from the viewpoint of superior processability and rolling resistance property.

Among the above-mentioned SBRs, it is preferable to use E-SBR especially from the viewpoint of good processability, and to use the modified S-SBR especially from the viewpoint of superior rolling resistance property.

Further, SBR can be contained as a wet master batch of SBR and carbon black which is prepared by adding carbon black to SBR in a state of latex and then carrying out solidification using an acid or the like with stirring. The use of this wet master batch is good for improving dispersibility of carbon black and shortening a kneading time.

Examples of BR are a high cis 1,4-polybutadiene rubber (high cis BR), a butadiene rubber containing 1,2-syndiotactic polybutadiene crystals (SPB-containing BR), a modified butadiene rubber (modified BR) and the like.

The above-mentioned high cis BR is a butadiene rubber having a cis 1,4 bond quantity of not less than 90% by mass. Examples of such high cis BR are Nipol BR 1220 manufactured by ZEON Corporation, UBEPOL BR 130B and UBEPOL BR 150B manufactured by UBE Industries, Ltd., and the like.

The above-mentioned SPB-containing BR is not one prepared by simply dispersing 1,2-syndiotactic polybutadiene crystals in BR, but is preferably one prepared by dispersing 1,2-syndiotactic polybutadiene crystals after chemical bonding with BR. By dispersing the crystals after chemical bonding with a rubber component, good crack growth property and EB tend to be obtained.

Further, since 1,2-syndiotactic polybutadiene crystals contained in BR have sufficient hardness, enough E* can be obtained even in the case of less crosslink density. Therefore, the rubber composition can improve steering stability.

A melting point of 1,2-syndiotactic polybutadiene crystals is preferably not less than 180° C., more preferably not less than 190° C. When the melting point is lower than 180° C., crystals melt during vulcanization of a tire in a press and hardness tends to decrease. Further, the melting point of 1,2-syndiotactic polybutadiene crystals is preferably not more than 220° C., more preferably not more than 210° C. When the melting point exceeds 220° C., a molecular weight of BR is increased, and therefore, dispersibility in the rubber composition tends to be lowered.

In the SPB-containing BR, a content of insoluble matter in boiling n-hexane is preferably not less than 2.5% by mass, more preferably not less than 8% by mass. When the content is less than 2.5% by mass, there is a tendency that enough hardness of the rubber composition cannot be obtained. Further, the content of insoluble matter in boiling n-hexane is preferably not more than 22% by mass, more preferably not more than 20% by mass, further preferably not more than 18% by mass. When the content exceeds 22% by mass, the viscosity of BR itself becomes high and there is a tendency that dispersibility of BR and filler in the rubber composition is lowered. Here, the insoluble matter in boiling n-hexane means 1,2-syndiotactic polybutadiene in the SPB-containing BR.

In the SPB-containing BR, the content of 1,2-syndiotactic polybutadiene crystals is not less than 2.5% by mass, preferably not less than 10% by mass. When the content is less than 2.5% by mass, rubber hardness is insufficient. Further, the content of 1,2-syndiotactic polybutadiene crystals in BR is not more than 20% by mass, preferably not more than 18% by mass. When the content exceeds 20% by mass, BR is hardly dispersed in the rubber composition and processability is lowered.

Examples of such polybutadiene containing syndiotactic crystals are UBEPOL VCR303, UBEPOL VCR412 and UBEPOL VCR617 manufactured by UBE Industries, Ltd., and the like.

The above-mentioned modified BR is preferably one which is obtained by polymerizing 1,3-butadiene with a lithium initiator and then adding a tin compound, and has a terminal of a modified BR molecule bonded with a tin-carbon bond.

Examples of a lithium initiator are lithium compounds such as alkyl lithium, aryl lithium, vinyl lithium, organotin lithium and organonitrogen-lithium compounds, lithium metals, and the like. The modified BR having high vinyl content and low cis content can be prepared by using the above-mentioned lithium initiators as the initiator of the modified BR.

Examples of tin compounds are tin tetrachloride, butyltin trichloride, dibutyltin dichloride, dioctyltin dichloride, tributyltin chloride, triphenyltin chloride, diphenyl dibutyltin, triphenyltin ethoxide, diphenyl dimethyltin, ditolyltin chloride, diphenyltin dioctanoate, divinyl diethyltin, tetrabenzyl tin, dibutyltin distearate, tetraallyl tin, p-tributyltin styrene, and the like. These tin compounds may be used alone or in combination with two or more thereof.

The content of tin atoms in the modified BR is preferably not less than 50 ppm, more preferably not less than 60 ppm. When the content of tin atoms is less than 50 ppm, an effect of accelerating the dispersing of carbon black in the modified BR is small, and tan δ tends to increase. Further, the content of tin atoms is preferably not more than 3000 ppm, more preferably not more than 2500 ppm, further preferably not more than 250 ppm. When the content of tin atoms exceeds 3000 ppm, the extrusion processability of kneaded articles tends to be deteriorated, because the cohesiveness of the kneaded articles is bad and edge is not arranged.

The molecular weight distribution (Mw/Mn) of the modified BR is preferably not more than 2, more preferably not more than 1.5. When the Mw/Mn of the modified BR exceeds 2, there is a tendency that the dispersibility of carbon black is deteriorated and tan δ is increased.

The bonding quantity of vinyl of the modified BR is preferably not less than 5% by mass, more preferably not less than 7% by mass. It tends to be difficult to polymerize (produce) the modified BR when the bonding quantity of vinyl of the modified BR is less than 5% by mass. Further, the bonding quantity of vinyl of the modified BR is preferably not more than 50% by mass, more preferably not more than 20% by mass. When the bonding quantity of vinyl of the modified BR exceeds 50% by mass, the dispersibility of carbon black is deteriorated and tan δ tends to be increased.

Examples of such modified BR are BR1250H manufactured by ZEON Corporation, N102 manufactured by Asahi Kasei Corporation, and the like.

The content of BR (a3) in the rubber composition (A) is not more than 60% by mass, preferably not more than 50% by mass, and is preferably not more than 20% by mass from the viewpoint of good processability, and is further preferably not more than 18% by mass, particularly preferably not more than 15% by mass from the viewpoint of good EB. The content of BR is most preferably 0% by mass in order to obtain utmost effects of containing NR and SBR. Further, the content of BR (a3) is preferably not less than 10% by mass, more preferably not less than 15% by mass from the viewpoint of crack growth property.

Among the above-mentioned BRs, it is preferable to use the modified BR especially from the viewpoint of superior rolling resistance property, and to use the high cis BR from the viewpoint of superior crack growth property.

In addition to the rubber components (a1), (a2) and (a3), other rubber components which are usually used in the field of rubber industry can be contained in the rubber component (A). From the viewpoint of superior rolling resistance property, reversion property and durability, preferred is a rubber component comprising specific amounts of (a1) NR and/or IR and (a2) at least one SBR selected from the group consisting of E-SBR, S-SBR and modified SBR, and further, more preferred is a rubber component comprising specific amounts of (a1) NR and (a2) E-SBR from the viewpoint of enabling cost to be reduced.

The rubber composition of the present invention comprises the alkylphenol-sulfur chloride condensate (B) as a vulcanization accelerator. There are other vulcanization accelerators such as a citraconimide compound, an organic thiosulfate compound and a metal salt of methacrylic acid, but the alkylphenol-sulfur chloride condensate (B) is used from the viewpoint of low cost.

Examples of the alkylphenol-sulfur chloride condensate (B) are those represented by the formula (1):

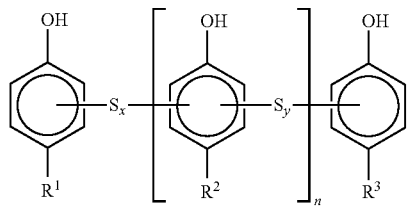
(1)

wherein $R^1$, $R^2$ and $R^3$ are the same or different and each is an alkyl group having 5 to 12 carbon atoms; x and y are the same or different and each is an integer of from 1 to 3; n is an integer of from 0 to 250.

"n" is preferably an integer of from 0 to 250, more preferably an integer of from 2 to 200, further preferably an integer of from 20 to 100 from the viewpoint of good dispersibility of the alkylphenol-sulfur chloride condensate (B) in the rubber component (A).

"x" and "y" are the same or different and each is preferably an integer of from 1 to 3 and more preferably the both are 2 from the viewpoint that high hardness can be efficiently exhibited (reversion is suppressed).

Each of $R^1$, $R^2$ and $R^3$ is preferably an alkyl group having 5 to 12 carbon atoms, more preferably an alkyl group having 6 to 9 carbon atoms from the viewpoint of good dispersibility of the alkylphenol-sulfur chloride condensate (B) in the rubber component (A).

The alkylphenol-sulfur chloride condensate (B) can be prepared by a known method, and a preparation method is not limited particularly. For example, there is a method for allowing alkylphenol to react with sulfur chloride, for example, in a molar ratio of 1:0.9 to 1.25.

Example of the alkylphenol-sulfur chloride condensate (B) is TACKIROL V200:

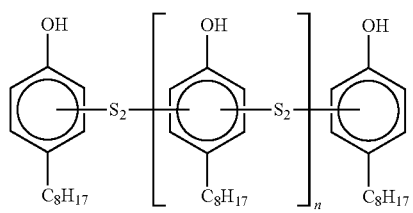

manufactured by Taoka Chemical Co., Ltd., in which "n" is an integer of 0 to 100, "x" and "y" are 2, R is $C_8H_{17}$ (octyl group), and a sulfur content is 24% by mass.

The content of the alkylphenol-sulfur chloride condensate (B) based on 100 parts by mass of the rubber component (A) is not less than 0.2 part by mass from the viewpoint of good rolling resistance property, and is preferably not less than 0.5 part by mass, further preferably not less than 1 part by mass from the viewpoint of more excellent rolling resistance property. Further, the content of the alkylphenol-sulfur chloride condensate (B) is not more than 4 parts by mass, preferably not more than 3 parts by mass, more preferably not more than 2 parts by mass from the viewpoint of superior durability and processability.

The BET specific surface area of carbon black (C) is preferably not less than 25 $m^2/g$ from the viewpoint of superior E*, EB and durability, and further preferably not less than 30 $m^2/g$ from the viewpoint of superior E* and EB. Further, the BET specific surface area of carbon black is preferably not more than 50 $m^2/g$ since tan δ is decreased and rolling resistance property is good, and is preferably not more than 45 $m^2/g$ from the viewpoint of superior rolling resistance property.

The content of carbon black is not less than 20 parts by mass from the viewpoint of good crack growth property and durability, and is further preferably not less than 30 parts by mass from the viewpoint of good durability. Further, the content of carbon black is not more than 59 parts by mass, preferably not more than 55 parts by mass from the viewpoint of superior processability and rolling resistance property, and from the viewpoint of good rolling resistance property, is more preferably not more than 50 parts by mass, further preferably not more than 45 parts by mass.

In addition to the carbon black (C), the rubber composition can contain reinforcing fillers, for example, silica such as wet silica and dry silica, clay, alumina, mica, carbon black other than the carbon black (C), and the like, which are usually used for preparation of a rubber composition. From the viewpoint that rolling resistance property can be improved, it is preferable to contain silica, and from the viewpoint of good elongation and for maintaining uniform dimensions (not to cause shrinking) when processing into a sheet, it is preferable to contain only carbon black as a reinforcing filler.

When silica is contained as a reinforcing filler other than the carbon black (C), the content thereof is preferably not more than 10 parts by mass, more preferably not more than 8 parts by mass based on 100 parts by mass of the rubber component (A). When the content of silica is more than 10 parts by mass, processability in forming into a sheet tends to be deteriorated so much. Meanwhile, it is preferable not use silica because in a preparation process of a rubber composition for insulation, an excluded sheet is easily subject to heat shrinkage, and from the viewpoint of good rolling resistance property, a lower limit of the content of silica is preferably not less than 5 parts by mass.

The BET specific surface area of silica is preferably not less than 50 $m^2/g$, more preferably not less than 80 $m^2/g$ from the viewpoint of good EB and E*. Further, the BET specific surface area of silica is preferably not more than 300 $m^2/g$, more preferably not more than 250 $m^2/g$ from the viewpoint of superior rolling resistance property.

The filler (D) can be contained in the rubber composition for insulation of the present invention for the purposes of reducing cost and decreasing a weight of the rubber composition to assure lower fuel cost of a tire having insulation comprising the rubber composition.

The average particle size of the filler (D) is preferably not more than 50 μm, more preferably not more than 20 μm for preventing the contained filler from becoming a starting point of cracking not to lower durability. Further, the average particle size of the filler (D) is preferably not less than 0.5 μm, more preferably not less than 1 μm. When the average particle size of the filler (D) is less than 0.5 μm, cost tends to increase.

Here, the average particle size of the filler (D) is an average particle size based on a mass calculated from a particle size distribution measured in accordance with JIS Z 8815-1994.

The specific gravity of the filler (D) is preferably not more than 3.0, more preferably not more than 2.8. When the specific gravity of the filler (D) is more than 3.0, there is a tendency that an effect of making a weight of the rubber composition light with the filler cannot be obtained and an effect of achieving lower fuel cost of a tire is hardly obtained.

The content of the filler (D) is preferably not less than 3 parts by mass, more preferably not less than 7 parts by mass based on 100 parts by mass of the rubber component for exhibiting an effect to be given by containing the filler. Further, the content of the filler (D) is preferably not more than 30 parts by mass, more preferably not more than 20 parts by mass based on 100 parts by mass of the rubber component for preventing reaggregation of the filler resulting from the use on a tire not to lower crack growth property and durability.

Examples of the filler (D) are a pulverized bituminous coal powder, calcium carbonate, talc, hard clay, sepiolite, a diatomaceous earth powder and the like, and these fillers may be used alone or may be used in combination with two or more thereof. Among these fillers, a pulverized bituminous coal powder and calcium carbonate are preferred from the viewpoint of cost, and a pulverized bituminous coal powder is preferred more from the viewpoint of cost, a low specific gravity and superior processability.

The above-mentioned sepiolite is an inorganic material (rod-like silica) being in the form of rod or needle and having a silanol group on its surface, and differs from the above-mentioned silica having a spherical form and contained as a reinforcing filler. The BET specific surface area of sepiolite is from 200 to 500 $m^2/g$, and its average length is regarded as the above-mentioned average particle size. In this specification, when indicated simply by silica, it means spherical silica contained as a reinforcing filler unless otherwise noted.

The rubber composition of the present invention can contain optionally compounding ingredients, which are usually used in the field of rubber industry, for example, sulfur, a silane coupling agent, various softening agents such as oil and C5 petroleum resin, various antioxidants, zinc oxide, stearic acid, various vulcanization accelerators and the like, in addition to the rubber component (A), the alkylphenol-sulfur chloride condensate (B), the reinforcing filler such as the carbon black (C) and the filler (D).

Powder sulfur and insoluble sulfur subjected to oil treatment, which are usually used in the field of rubber industry, can be used suitably as sulfur.

In the present invention, a total amount of sulfur contained in the alkylphenol-sulfur chloride condensate (B) and powder sulfur and insoluble sulfur subjected to oil treatment, which are added according to necessity, is referred to as a total sulfur content. Meanwhile, sulfur contained in a vulcanization accelerator to be added if necessary is not released into a rubber, and therefore, is not included in the total sulfur content of the present invention.

The total sulfur content is preferably not less than 1.5 parts by mass, more preferably not less than 1.6 parts by mass based on 100 parts by mass of the rubber component (A). When the total sulfur content is less than 1.5 parts by mass, E* tends to be decreased. Further, the total sulfur content is preferably not more than 2.5 parts by mass, more preferably not more than 2.3 parts by mass based on 100 parts by mass of the rubber component (A). When the total sulfur content is more than 2.5 parts by mass, there is a tendency that EB is lowered due to deterioration by thermal oxidation and further, durability is lowered.

The complex elastic modulus (E*) of the rubber composition of the present invention under the conditions of a temperature of 70° C., a frequency of 10 Hz, an initial strain of 10% and a dynamic strain of 2% is preferably from 2.0 to 4.0 MPa for making deflection of a sidewall easy, improving rolling resistance property of a tire and improving crack growth property. Further, a loss tangent (tan δ) under the conditions of a temperature of 70° C., a frequency of 10 Hz, an initial strain of 10% and a dynamic strain of 2% is preferably not more than 0.14 from the viewpoint of good heat build up characteristic and rolling resistance property. Moreover, a lower limit of a preferred loss tangent is not limited particularly, and when the rubber composition for insulation has a loss tangent of not less than 0.05, sufficient rolling resistance property can be obtained.

The rubber composition for insulation of the present invention is prepared by a usual method. Namely, the rubber composition for insulation of the present invention is prepared by kneading the above-mentioned rubber component and compounding ingredients to be blended according to necessity with a banbury mixer, a kneader or an open roll and then carrying out vulcanization.

The tire of the present invention is produced by a usual method using insulation prepared using the rubber composition for insulation of the present invention. Namely, the rubber composition for insulation of the present invention is extruded and processed into a shape of insulation of a tire at an unvulcanized stage thereof, and lamination of the insulation and other tire members is carried out on a tire molding machine to mold an unvulcanized tire. The unvulcanized tire is heated and pressed in a vulcanizing machine to obtain the tire of the present invention.

The tire of the present invention is explained by referring to the attached drawing, but is not limited to this embodiment.

The tire of the present invention has the insulation comprising the rubber composition for insulation of the present invention. The insulation can be formed into the tie gum 6 and/or the inner layer sidewall 4 shown in FIG. 1.

The tie gum 6 is a member to be provided between the inner liner 7 and the case 5. In FIG. 1, while the end of the tie gum 6 is provided up to the top end of the chafer 9 located at an inner side of the tire, it can be properly adjusted within a range up to the end of the case 5. The inner layer sidewall 4 is a member to be provided between the case 5 and the outer layer sidewall 3. The positions of an upper end and a lower end of the inner layer sidewall 4 can be properly adjusted.

It is preferable that the tire of the present invention is formed into a tire having a tie gum comprising the rubber composition of the present invention since requirements for rolling resistance property and cost can be satisfied, and it is preferable that the tire of the present invention is formed into a tire having an inner layer sidewall comprising the rubber composition of the present invention since requirements for rolling resistance property, steering stability and cost can be satisfied. Further, a tire having a tie gum and an inner layer sidewall, the both of which comprise the rubber composition of the present invention, is more preferred since requirements for rolling resistance property, steering stability and cost can be satisfied.

EXAMPLE

The present invention is explained by means of Examples, but is not limited thereto.

Various chemicals used in Examples and Comparative Examples are collectively described below.
NR: TSR20
IR: Nipol IR2200 manufactured by ZEON Corporation
E-SBR: Nipol BR1502 manufactured by ZEON Corporation (styrene unit content: 23% by mass)
Modified S-SBR: HPR 340 manufactured by JSR Co., Ltd. (Styrene bond content: 10% by mass, vinyl content: 42% by mass, coupled with alkoxysilane and introduced in terminal)
High cis BR: UBEPOL BR150B manufactured by UBE Industries, Ltd. (cis 1,4 bond content: 97% by mass)
SPB-containing BR: UBEPOL VCR617 manufactured by UBE Industries, Ltd. (Dispersion of 1,2-syndiotactic polybutadiene crystals, Content of 1,2-syndiotactic polybutadiene crystals: 17% by mass, Melting point of 1,2-syndiotactic polybutadiene crystals: 200° C., Content of insoluble matter in boiling n-hexane: 15 to 18% by mass)

Modified BR: Nipol BR1250H manufactured by ZEON Corporation (Polymerization with a lithium initiator, Content of tin atom: 250 ppm, Mw/Mn: 1.5, Content of vinyl bond: 10 to 13% by mass)

Carbon black 1: Statex N762 available from Columbia Carbon Japan (BET specific surface are: 29 $m^2/g$)

Carbon black 2: SHOBLACK N660 available from CABOT Japan K. K. (BET specific surface are: 35 $m^2/g$)

Carbon black 3: SHOBLACK N550 available from CABOT Japan K. K. (BET specific surface are: 43 $m^2/g$)

Carbon black 4: SHOBLACK N330 available from CABOT Japan K. K. (BET specific surface are: 78 $m^2/g$)

Silica: Ultrasil VN3 available from Evonik Degussa Japan Co., Ltd. (BET specific surface are: 175 $m^2/g$)

Pulverized bituminous coal powder 1: Austin Black 325 available from Coal Fillers Inc. (Average particle size: 5 μm, Oil content: 17%, Specific gravity: 1.30)

Pulverized bituminous coal powder 2: Austin Black 325 available from Coal Fillers Inc. (Average particle size: 20 μm, Oil content: 17%, Specific gravity: 1.30)

Pulverized bituminous coal powder 3: Austin Black 325 available from Coal Fillers Inc. (Average particle size: 80 μm, Oil content: 17%, Specific gravity: 1.30)

Pulverized bituminous coal powder 4: Austin Black 325 available from Coal Fillers Inc. (Average particle size: 200 μm, Oil content: 17%, Specific gravity: 1.30)

Calcium carbonate 1: Tankaru 200 manufactured by Takehara Kagaku Kogyo Co., Ltd. (Average particle size: 2.7 μm, Specific gravity: 2.68)

Talc: MISTRON VAPOR manufactured by Nihon Mistron Co., Ltd. (Average particle size: 5.5 μm, Specific gravity: 0.20)

Hard clay: Hard Clay Crown available from Southeastern Clay Company (Average particle size: 0.6 μm, Specific gravity: 2.6, Hydrated Al silicate ($SiO_2/Al_2O_3$))

Sepiolite: PANGEL available from TOLSA (Average length: 300 nm, Specific gravity: 2.1, Wet-pulverized sepiolite mineral)

Calcium carbonate 2: Polcarb 90 available from Imerys (Average particle size 0.85 μm, Specific gravity: 2.7)

Diatomaceous earth powder: CelTiX T available from Imerys (Average particle size 1.50 μm, Specific gravity: 2.1)

C5 petroleum resin: Marcalets T-100AS available from Maruzen Petrochemical Co., Ltd. (Aliphatic hydrocarbon resin, Softening point: 100° C.)

Silane coupling agent: Si75 available from Evonik Degussa Japan Co., Ltd.

Oil: VIVATEC 400 available from Hansen-Rosenthal (TDAE oil)

Zinc oxide: Zinc Oxide No. 1 available from Mitsui Mining and Smelting Co., Ltd.

Stearic acid: Stearic acid available from NOF CORPORATION

Antioxidant 6PPD: Santoflex 13 available from Flexsys Chemicals Sdn. Bhd.

Alkylphenol-sulfur chloride condensate 1: TACKIROL V200:

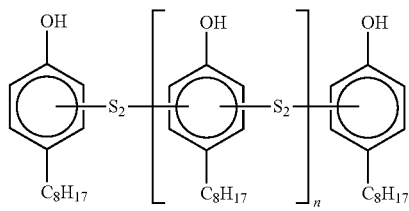

manufactured by Taoka Chemical Co., Ltd., in which n: 0 to 100, R: octyl group, x: 2, y: 2, sulfur content: 24% by mass, weight average molecular weight: 9000.

Alkylphenol-sulfur chloride condensate 2: TS3101 (product made on an experimental basis):

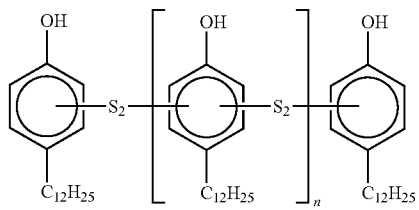

manufactured by Taoka Chemical Co., Ltd., in which n: 150 to 200, R: dodecyl group, x: 2, y: 2, sulfur content: 27% by mass, weight average molecular weight: 62000.

Insoluble sulfur (including 10% of oil): SEIMISULFUR available from NIPPON KANRYU Industry Co., Ltd. (Insoluble sulfur including at least 60% of insoluble matter by carbon disulfide and 10% by mass of oil)

Vulcanization accelerator TBBS: NOCCELER NS manufactured by OUCHISHINKO CHEMICAL INDUSTRIAL CO., LTD. (N-tert-butyl-2-benzothiazolylsulfenamide)

Examples 1 to 36 and Comparative Examples 1 to 11

Among the compounding ingredients shown in Tables 1 to 4, various chemicals (except alkylphenol-sulfur chloride condensate, insoluble sulfur and vulcanization accelerator TBBS) were kneaded with a banbury mixer to obtain a kneaded product. Then, alkylphenol-sulfur chloride condensate, insoluble sulfur and vulcanization accelerator TBBS were added to the obtained kneaded product, followed by kneading to obtain an unvulcanized rubber composition. The obtained unvulcanized rubber composition was subjected to 12-minute press-vulcanization at 170° C. to prepare vulcanized rubber compositions of Examples 1 to 36 and Comparative Examples 1 to 11, and a viscoelasticity test and a tensile test were carried out.

(Viscoelasticity Test)

The prepared test piece was cut into a sheet of 4 mm wide×40 mm long×2 mm thick, and a complex elastic modulus E* (MPa) and a loss tangent (tan δ) of the vulcanized rubber compositions were measured under the conditions of a temperature of 70° C., a frequency of 10 Hz, an initial strain of 10% and a dynamic strain of 2%, using a viscoelasticity spectrometer VES manufactured by Iwamoto Seisakusyo K. K. It is indicated that the larger the E* is, the higher the rigidity is and the more superior the steering stability is, and that the smaller the tan δ is, the smaller the rolling resistance is and the more superior the rolling resistance property is.

(Tensile Test)

Tensile test was carried out in accordance with JIS K 6251, "Rubber, vulcanized or thermoplastic—Determination of tensile stress-strain properties" by using a test piece of No. 3 dumbbell comprising the above-mentioned rubber compositions, and elongation at break EB (%) was measured. The larger the EB is, the more the filler is dispersed, which indicates that a rubber strength and durability are good.

Further, the extrusion molding of the unvulcanized rubber compositions was carried out with an extruder equipped with a pipe sleeve with a predetermined shape and the obtained rubber compositions were laminated with other tire members to form an unvulcanized tire which was then subjected to press-vulcanization for 12 minutes at 170° C. to prepare a test tire (size: 195/65R15).

(High Load Durability Test on Drum)

The tires were run on a drum at a speed of 20 km/h under the condition of 230% load which is a maximum load (under the condition of maximum inner pressure) of JIS Standard. The running distance until the tire was damaged was measured. The durability index of Comparative Example 11 was referred to as 100, and the running distance of each compounding formulation was indicated by a durability index obtained by the following equation. Here, it is indicated that the larger the durability index is, the more superior the durability is.

(Durability index)=(Running distance of each compounding formulation)÷(Running distance of Comparative Example 11)×100

(Sheet Processability Test)

Evaluation was made with respect to four points such as scorching of the extruded composition, sheet flatness, sheet shrinkability and evenness of an edge of a sheet when the unvulcanized rubber composition was extrusion-molded. The sheet processability index of Comparative Example 11 was referred to as 100, and the sheet processability of each compounding formulation is indicated by an index. Here, it is indicated that the larger the sheet processability index is, the more superior the processability is.

The results of the viscoelasticity test, tensile test, high load durability test on drum and sheet processability test are shown in Tables 1 to 4.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 27 | 10 | 11 | 12 |
| Compounding amount (parts by mass) | | | | | | | | | | | | | |
| NR | 70 | 50 | 30 | 60 | 35 | 75 | 70 | 70 | 70 | 70 | 70 | 60 | 60 |
| IR | — | — | — | — | 35 | 10 | — | — | — | — | — | — | — |
| E-SBR | 30 | 50 | 70 | 25 | 30 | 15 | — | 30 | 30 | 30 | 30 | 25 | 20 |
| Modified S-SBR | — | — | — | — | — | — | 30 | — | — | — | — | — | — |
| High cis BR | — | — | — | 15 | — | — | — | — | — | — | — | — | — |
| SPB-containing BR | — | — | — | — | — | — | — | — | — | — | — | 15 | — |
| Modified BR | — | — | — | — | — | — | — | — | — | — | — | — | 20 |
| Carbon black 1 | — | — | — | — | — | — | — | — | 40 | 55 | — | — | 35 |
| Carbon black 2 | 40 | 40 | 40 | 40 | 40 | 40 | 40 | 20 | — | — | — | 40 | — |
| Carbon black 3 | — | — | — | — | — | — | — | — | — | — | 40 | — | — |
| Carbon black 4 | — | — | — | — | — | — | — | — | — | — | — | — | — |
| Silica | — | — | — | — | — | — | — | — | — | — | — | — | — |
| Pulverized bituminous coal powder 1 | 20 | 20 | 20 | 20 | 20 | 20 | 20 | 40 | 20 | 10 | 20 | 20 | 20 |
| Pulverized bituminous coal powder 2 | — | — | — | — | — | — | — | — | — | — | — | — | — |
| Pulverized bituminous coal powder 3 | — | — | — | — | — | — | — | — | — | — | — | — | — |
| Pulverized bituminous coal powder 4 | — | — | — | — | — | — | — | — | — | — | — | — | — |
| Calcium carbonate 1 | — | — | — | — | — | — | — | — | — | — | — | — | — |
| Talc | — | — | — | — | — | — | — | — | — | — | — | — | — |
| C5 petroleum resin | 4.0 | 4.0 | 4.0 | 4.0 | 4.0 | 4.0 | 4.0 | 4.0 | 4.0 | 4.0 | 4.0 | 4.0 | 4.0 |
| Oil | 2.0 | 2.0 | 2.0 | 2.0 | 2.0 | 2.0 | 2.0 | 2.0 | 2.0 | 2.0 | 2.0 | 2.0 | 2.0 |
| Silane coupling agent | — | — | — | — | — | — | — | — | — | — | — | — | — |
| Zinc oxide | 5.0 | 5.0 | 5.0 | 5.0 | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 | 2.0 | 2.0 | 2.0 | 2.0 |
| Antioxidant 6PPD | 1.0 | 1.0 | 1.0 | 1.0 | 1.0 | 1.0 | 1.0 | 1.0 | 1.0 | 1.0 | 1.0 | 1.0 | 1.0 |
| Insoluble sulfur | 1.8 | 1.8 | 1.8 | 1.8 | 1.8 | 1.8 | 1.8 | 1.8 | 1.8 | 1.8 | 1.8 | 1.8 | 1.8 |
| Alkylphenol sulfur chloride condensate 1 | 1.0 | 1.0 | 1.0 | 1.0 | 1.0 | 1.0 | 1.0 | 1.0 | 1.0 | 1.0 | 1.0 | 1.0 | 1.0 |
| Alkylphenol-sulfur chloride condensate 2 | — | — | — | — | — | — | — | — | — | — | — | — | — |
| Total sulfur content | 1.86 | 1.86 | 1.86 | 1.86 | 1.86 | 1.86 | 1.86 | 1.86 | 1.86 | 1.86 | 1.86 | 1.86 | 1.86 |
| Vulcanization accelerator TBBS | 0.8 | 0.8 | 0.8 | 0.8 | 0.8 | 0.8 | 0.8 | 0.8 | 0.8 | 0.6 | 0.8 | 0.8 | 0.8 |
| Evaluation result | | | | | | | | | | | | | |
| E* (MPa) | 3.82 | 4.11 | 4.38 | 3.88 | 3.75 | 3.67 | 3.71 | 3.86 | 3.55 | 3.84 | 4.11 | 4.05 | 3.51 |
| tanδ | 0.128 | 0.136 | 0.142 | 0.124 | 0.124 | 0.121 | 0.105 | 0.13 | 0.117 | 0.131 | 0.141 | 0.131 | 0.068 |
| EB (%) | 510 | 470 | 450 | 470 | 500 | 590 | 460 | 495 | 460 | 460 | 540 | 475 | 445 |
| Durability index | 125 | 115 | 110 | 115 | 125 | 105 | 130 | 105 | 125 | 110 | 115 | 115 | 105 |
| Sheet processability index | 120 | 120 | 115 | 115 | 140 | 115 | 95 | 95 | 130 | 120 | 125 | 140 | 100 |

TABLE 2

| | Examples | | | | | | | | | | | | | |
|---|---|---|---|---|---|---|---|---|---|---|---|---|---|---|
| | 13 | 14 | 15 | 16 | 17 | 18 | 19 | 20 | 21 | 22 | 23 | 24 | 25 | 26 |
| Compounding amount (parts by mass) | | | | | | | | | | | | | | |
| NR | 70 | 70 | 70 | 70 | 70 | 70 | 70 | 70 | 70 | 70 | 70 | 70 | 70 | 70 |
| IR | — | — | — | — | — | — | — | — | — | — | — | — | — | — |
| E-SBR | 30 | 30 | 30 | 30 | 30 | 30 | 30 | 30 | 30 | 30 | 30 | 30 | 30 | 30 |
| Modified S-SBR | — | — | — | — | — | — | — | — | — | — | — | — | — | — |
| High cis BR | — | — | — | — | — | — | — | — | — | — | — | — | — | — |
| SPB-containing BR | — | — | — | — | — | — | — | — | — | — | — | — | — | — |
| Modified BR | — | — | — | — | — | — | — | — | — | — | — | — | — | — |
| Carbon black 1 | — | — | — | — | — | — | — | — | — | — | — | — | — | — |
| Carbon black 2 | 40 | 40 | 40 | 40 | 40 | 40 | 40 | 40 | 40 | 40 | 40 | 30 | 43 | 40 |
| Carbon black 3 | — | — | — | — | — | — | — | — | — | — | — | — | — | — |
| Carbon black 4 | — | — | — | — | — | — | — | — | — | — | — | — | — | — |
| Silica | — | — | — | — | — | — | — | — | — | — | — | 10 | — | — |
| Pulverized bituminous coal powder 1 | 5.0 | 10 | 30 | 20 | 20 | 20 | 20 | 20 | — | — | — | 20 | — | — |
| Pulverized bituminous coal powder 2 | — | — | — | — | — | — | — | — | 20 | — | — | — | — | — |
| Pulverized bituminous coal powder 3 | — | — | — | — | — | — | — | — | — | — | — | — | — | — |
| Pulverized bituminous coal powder 4 | — | — | — | — | — | — | — | — | — | — | — | — | — | — |
| Calcium carbonate 1 | — | — | — | — | — | — | — | — | — | — | 20 | — | — | — |
| Talc | — | — | — | — | — | — | — | — | — | 20 | — | — | — | — |
| C5 petroleum resin | 4.0 | 4.0 | 4.0 | 4.0 | 4.0 | 4.0 | 4.0 | 4.0 | 4.0 | 4.0 | 4.0 | 4.0 | 4.0 | 4.0 |
| Oil | 2.0 | 2.0 | 2.0 | 2.0 | 2.0 | 2.0 | 2.0 | 2.0 | 2.0 | 2.0 | 2.0 | 2.0 | 2.0 | 2.0 |
| Silane coupling agent | — | — | — | — | — | — | — | — | — | — | — | 0.6 | — | — |
| Zinc oxide | 5.0 | 5.0 | 5.0 | 5.0 | 5.0 | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 | 2.0 | 2.0 | 2.0 | 2.0 | 2.0 |
| Antioxidant 6PPD | 1.0 | 1.0 | 1.0 | 1.0 | 1.0 | 1.0 | 1.0 | 1.0 | 1.0 | 1.0 | 1.0 | 1.0 | 1.0 | 1.0 |
| Insoluble sulfur | 1.8 | 1.8 | 1.8 | 2.0 | 1.4 | 0.8 | 1.8 | 2.0 | 1.8 | 1.8 | 1.8 | 1.8 | 1.8 | 1.8 |
| Alkylphenol-sulfur chloride condensate 1 | 1.0 | 1.0 | 1.0 | 0.5 | 2.0 | 4.0 | — | — | 1.0 | 1.0 | 1.0 | 1.0 | 1.0 | 1.0 |
| Alkylphenol-sulfur chloride condensate 2 | — | — | — | — | — | — | 1.0 | 0.5 | — | — | — | — | — | — |
| Total sulfur content | 1.86 | 1.86 | 1.86 | 1.92 | 1.74 | 1.68 | 1.89 | 1.935 | 1.86 | 1.86 | 1.86 | 1.86 | 1.86 | 1.86 |
| Vulcanization accelerator TBBS | 0.8 | 0.8 | 0.8 | 0.8 | 0.8 | 0.8 | 0.8 | 0.8 | 0.8 | 0.8 | 0.8 | 0.8 | 0.8 | 0.8 |
| Evaluation result | | | | | | | | | | | | | | |
| E* (MPa) | 3.70 | 3.77 | 3.94 | 3.88 | 3.87 | 3.89 | 3.85 | 3.92 | 3.76 | 3.75 | 3.71 | 3.65 | 3.89 | 3.64 |
| tan δ | 0.123 | 0.126 | 0.137 | 0.141 | 0.11 | 0.098 | 0.124 | 0.132 | 0.125 | 0.135 | 0.134 | 0.116 | 0.134 | 0.120 |
| EB (%) | 520 | 510 | 440 | 525 | 460 | 410 | 525 | 545 | 495 | 525 | 540 | 545 | 505 | 525 |
| Durability index | 120 | 120 | 105 | 115 | 110 | 100 | 125 | 115 | 115 | 120 | 120 | 130 | 120 | 120 |
| Sheet processability index | 95 | 105 | 100 | 120 | 105 | 90 | 125 | 125 | 120 | 120 | 120 | 85 | 105 | 90 |

TABLE 3

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Compounding amount (parts by mass) | | | | | | | | | | | |
| NR | 15 | 100 | 30 | 70 | 70 | 70 | 70 | 70 | 15 | 15 | 70 |
| IR | — | — | — | — | — | — | — | — | — | — | — |
| E-SBR | 85 | — | 30 | 30 | 30 | 30 | 30 | 30 | 85 | 85 | 30 |
| Modified S-SBR | — | — | — | — | — | — | — | — | — | — | — |
| High cis BR | — | — | 40 | — | — | — | — | — | — | — | — |
| SPB-containing BR | — | — | — | — | — | — | — | — | — | — | — |
| Modified BR | — | — | — | — | — | — | — | — | — | — | — |
| Carbon black 1 | — | — | — | — | — | — | — | 70 | — | — | 60 |
| Carbon black 2 | 40 | 40 | — | — | — | 40 | 40 | — | 40 | 40 | — |
| Carbon black 3 | — | — | — | 15 | — | — | — | — | — | — | — |
| Carbon black 4 | — | — | — | — | 40 | — | — | — | — | — | — |
| Silica | — | — | — | — | — | — | — | — | — | — | — |
| Pulverized bituminous coal powder 1 | 20 | 20 | 20 | 20 | 20 | 20 | 20 | — | — | — | 20 |
| Pulverized bituminous coal powder 2 | — | — | — | — | — | — | — | — | — | — | — |
| Pulverized bituminous coal powder 3 | — | — | — | — | — | — | — | — | 20 | — | — |
| Pulverized bituminous coal powder 4 | — | — | — | — | — | — | — | — | — | 20 | — |
| Calcium carbonate 1 | — | — | — | — | — | — | — | — | — | — | — |
| Talc | — | — | — | — | — | — | — | — | — | — | — |
| C5 petroleum resin | 4.0 | 4.0 | 4.0 | 4.0 | 4.0 | 4.0 | 4.0 | 4.0 | 4.0 | 4.0 | — |
| Oil | 2.0 | 2.0 | 2.0 | 2.0 | 2.0 | 2.0 | 2.0 | 2.0 | 2.0 | 2.0 | 10 |
| Silane coupling agent | — | — | — | — | — | — | — | — | — | — | — |
| Zinc oxide | 5.0 | 5.0 | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 | 2.0 | 2.0 |
| Antioxidant 6PPD | 1.0 | 1.0 | 1.0 | 1.0 | 1.0 | 1.0 | 1.0 | 1.0 | 1.0 | 1.0 | 1.0 |
| Insoluble sulfur | 1.8 | 1.8 | 1.8 | 1.8 | 1.8 | 2 | 0.1 | 1.2 | 1.8 | 1.8 | 2.0 |
| Alkylphenol-sulfur chloride condensate 1 | 1.0 | 1.0 | 1.0 | 1.0 | 1.0 | 0.1 | 6.0 | 1.0 | 1.0 | 1.0 | — |
| Alkylphenol-sulfur chloride condensate 2 | — | — | — | — | — | — | — | — | — | — | — |
| Total sulfur content | 1.86 | 1.86 | 1.86 | 1.86 | 1.86 | 1.824 | 1.53 | 1.32 | 1.86 | 1.86 | 1.8 |
| Vulcanization accelerator TBBS | 0.8 | 0.8 | 0.8 | 0.8 | 0.8 | 0.8 | 0.8 | 0.8 | 0.8 | 0.8 | 0.8 |
| Evaluation result | | | | | | | | | | | |
| E* (MPa) | 4.58 | 3.55 | 3.89 | 2.85 | 4.75 | 3.86 | 3.91 | 5.45 | 3.65 | 3.61 | 3.95 |
| tanδ | 0.154 | 0.124 | 0.122 | 0.101 | 0.155 | 0.156 | 0.091 | 0.175 | 0.134 | 0.144 | 0.153 |
| EB (%) | 440 | 600 | 410 | 555 | 560 | 545 | 320 | 525 | 440 | 350 | 545 |
| Durability index | 80 | 50 | 90 | 60 | 80 | 100 | 50 | 70 | 60 | 30 | 100 |
| Sheet processability index | 115 | 100 | 50 | 30 | 100 | 120 | 60 | 80 | 115 | 90 | 100 |

TABLE 4

| | Examples | | | | | | | | |
|---|---|---|---|---|---|---|---|---|---|
| | 28 | 29 | 30 | 31 | 32 | 33 | 34 | 35 | 36 |
| Compounding amount (parts by mass) | | | | | | | | | |
| NR | 70 | 70 | 70 | 70 | 70 | 70 | 70 | 70 | 40 |
| IR | — | — | — | — | — | — | — | — | — |
| E-SBR | 30 | 30 | 30 | 30 | 30 | 30 | — | — | — |
| Modified S-SBR | — | — | — | — | — | — | — | — | — |
| High cis BR | — | — | — | — | — | — | 30 | 30 | 60 |
| SPB-containing BR | — | — | — | — | — | — | — | — | — |
| Modified BR | — | — | — | — | — | — | — | — | — |
| Carbon black 1 | — | — | — | — | — | — | — | — | — |
| Carbon black 2 | 40 | 40 | 40 | 40 | 40 | 40 | 40 | 40 | 40 |
| Carbon black 3 | — | — | — | — | — | — | — | — | — |
| Carbon black 4 | — | — | — | — | — | — | — | — | — |
| Silica | — | — | — | — | — | — | — | — | — |
| Pulverized bituminous coal powder 1 | — | — | — | — | — | 10 | 20 | — | 20 |

TABLE 4-continued

| | Examples | | | | | | | | |
|---|---|---|---|---|---|---|---|---|---|
| | 28 | 29 | 30 | 31 | 32 | 33 | 34 | 35 | 36 |
| Pulverized bituminous coal powder 2 | — | — | — | — | — | 10 | — | 20 | — |
| Pulverized bituminous coal powder 3 | 5.0 | 20 | — | — | — | — | — | — | — |
| Pulverized bituminous coal powder 4 | — | — | 20 | — | — | — | — | — | — |
| Calcium carbonate 1 | — | — | — | 20 | — | — | — | — | — |
| Talc | — | — | — | — | 20 | — | — | — | — |
| C5 petroleum resin | 4.0 | 4.0 | 4.0 | 4.0 | 4.0 | 4.0 | 4.0 | 4.0 | 4.0 |
| Oil | 2.0 | 2.0 | 2.0 | 2.0 | 2.0 | 2.0 | 2.0 | 2.0 | 2.0 |
| Silane coupling agent | — | — | — | — | — | — | — | — | — |
| Zinc oxide | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 |
| Antioxidant 6PPD | 1.0 | 1.0 | 1.0 | 1.0 | 1.0 | 1.0 | 1.0 | 1.0 | 1.0 |
| Insoluble sulfur | 1.8 | 1.8 | 1.8 | 1.8 | 1.8 | 1.8 | 1.8 | 1.8 | 1.8 |
| Alkylphenol-sulfur chloride condensate 1 | 1.0 | 1.0 | 1.0 | 1.0 | 1.0 | 1.0 | 1.0 | 1.0 | 1.0 |
| Alkylphenol-sulfur chloride condensate 2 | — | — | — | — | — | — | — | — | — |
| Total sulfur content | 1.86 | 1.86 | 1.86 | 1.86 | 1.86 | 1.86 | 1.86 | 1.86 | 1.86 |
| Vulcanization accelerator TBBS | 0.8 | 0.8 | 0.8 | 0.8 | 0.8 | 0.8 | 0.8 | 0.8 | 0.8 |
| Evaluation result | | | | | | | | | |
| E* (MPa) | 3.85 | 4.13 | 3.95 | 3.88 | 4.22 | 3.74 | 3.35 | 3.24 | 3.55 |
| tanδ | 0.125 | 0.128 | 0.133 | 0.137 | 0.139 | 0.131 | 0.115 | 0.119 | 0.109 |
| EB (%) | 515 | 505 | 525 | 520 | 520 | 525 | 525 | 515 | 485 |
| Durability index | 120 | 125 | 120 | 120 | 120 | 120 | 125 | 120 | 115 |
| Sheet processability index | 110 | 120 | 115 | 120 | 115 | 120 | 120 | 120 | 105 |

From Tables 1, 2 and 4, it is seen that low fuel cost is achieved and durability is improved by using the rubber composition for insulation comprising the specific rubber component (A), the alkylphenol-sulfur chloride condensate (B) and the specific carbon black (C) in specific amounts.

From Table 3, it is seen that rolling resistance property is inferior in Comparative Examples 1, 9 and 10, where the content of the SBR (a2) in the rubber component is high. Further, it is seen that in Comparative Example 2, where the content of the NR (a1) in the rubber component is high, reversion arises and durability is inferior. Moreover, it is seen that in Comparative Example 3, where the content of the BR (a3) in the rubber component is high, processability is inferior.

It is seen that in Comparative Example 4, where the content of the carbon black (C) is low, durability and processability are inferior. Further, it is seen that in Comparative Example 5, where carbon black which does not satisfy the requirement for BET specific surface are of the carbon black (C) is contained, rolling resistance property is inferior. Moreover, it is seen that in Comparative Examples 8 and 11, where the content of the carbon black (C) based on 100 parts by mass of the rubber component is high, rolling resistance property, durability and processability are inferior.

In Comparative Example 6, where the content of the alkylphenol-sulfur chloride condensate (B) is low, it is seen that rolling resistance property is inferior, and further, in Comparative Example 7, where the content of the alkylphenol-sulfur chloride condensate (B) is high, it is seen that scorching of a sheet arises while the extrusion is carried out and processability and durability are inferior.

EXPLANATION OF SYMBOLS

1 Tread portion
2 Breaker
3 Outer layer sidewall
4 Inner layer sidewall
5 Case
6 Tie gum
7 Inner liner
8 Clinch
9 Chafer
10 Bead core
R Rim

The invention claimed is:

1. A tire having insulation prepared from a rubber composition for insulation of a tire comprising:
   0.2 to 4 parts by mass of (B) an alkylphenol-sulfur chloride condensate, and
   20 to 59 parts by mass of (C) carbon black having a BET specific surface area of 25-35 m²/g,
   based on 100 parts by mass of (A) a rubber component consisting of
   30 to 85% by mass of (a1) a natural rubber and/or an isoprene rubber,
   0 to 70% by mass of (a2) at least one styrene butadiene rubber selected from the group consisting of an emulsion-polymerized styrene butadiene rubber, a solution-polymerized styrene butadiene rubber and an emulsion-polymerized modified styrene butadiene rubber, and
   0 to 60% by mass of (a3) a high cis 1,4-polybutadiene rubber and/or a butadiene rubber comprising 1,2-syndiotactic polybutadiene crystals, and
   (D) a filler which is at least one selected from the group consisting of a pulverized bituminous coal powder, calcium carbonate, talc, hard clay, sepiolite and a diatomaceous earth powder and has an average particle size of not more than 20 μm.

2. The tire of claim 1, wherein in the rubber component (A), (a1) is a natural rubber, and (a2) is an emulsion-polymerized styrene butadiene rubber.

3. The tire of claim 1, wherein the content of (a3) butadiene rubber in the rubber component (A) is 0% by mass, and the average particle size of the filler (D) is from 0.5 to 20 μm, and the content of the filler (D) is from 3 to 30 parts by mass based on 100 parts by mass of the rubber component.

4. The tire of claim 3, wherein the content of the alkylphenol-sulfur chloride condensate (B) is from 0.5 to 3 parts by mass, the content of the carbon black (C) is from 30 to 45 parts by mass, the content of the pulverized bituminous coal powder as the filler (D) is from 7 to 20 parts by mass, and further comprising silica contained in an amount of from 0 to 10 parts by mass based on 100 parts by mass of the rubber component.

\* \* \* \* \*